United States Patent
Hull et al.

[11] Patent Number: 5,192,559
[45] Date of Patent: Mar. 9, 1993

[54] APPARATUS FOR BUILDING THREE-DIMENSIONAL OBJECTS WITH SHEETS

[75] Inventors: Charles W. Hull, Santa Clarita; Paul F. Jacobs, La Crescenta; Kris A. Schmidt, Granada Hills; Dennis R. Smalley, Baldwin Park; Wayne A. Vinson, Valencia, all of Calif.

[73] Assignee: 3D Systems, Inc., Santa Clarita, Calif.

[21] Appl. No.: 803,681

[22] Filed: Dec. 3, 1991

Related U.S. Application Data

[63] Continuation of Ser. No. 589,060, Sep. 27, 1990.

[51] Int. Cl.$^5$ ............................ B29C 35/08; B29C 41/02
[52] U.S. Cl. .................................... 425/89; 156/379.6; 156/501; 156/512; 156/538; 219/121.65; 219/121.67; 219/121.73; 250/492.1; 425/174.4; 425/295; 425/297; 425/305.1; 425/308; 425/310; 425/375; 425/446
[58] Field of Search ............... 264/22, 25, 152, 163, 264/255, 308; 425/89, 174, 174.4, 295, 297, 305.1, 308, 310, 375, 446; 156/155, 242, 264, 267, 272.2, 272.8, 275.7, 292, 379.6, 501, 512, 538; 219/121.65, 121.66, 121.67, 121.72, 121.73, 121.85; 250/492.1

[56] References Cited

U.S. PATENT DOCUMENTS

| | | | |
|---|---|---|---|
| 4,211,825 | 7/1980 | Shipman | 156/272.2 X |
| 4,217,168 | 8/1980 | Ridgway et al. | 156/264 X |
| 4,436,570 | 3/1984 | Neuhaus et al. | 156/275.7 X |
| 4,752,352 | 6/1988 | Feygin | 156/264 X |

FOREIGN PATENT DOCUMENTS 250121 12/1987 European Pat. Off. .
WO89/11680 11/1989 PCT Int'l Appl. .

*Primary Examiner*—Leo B. Tentoni
*Attorney, Agent, or Firm*—Lyon & Lyon

[57] ABSTRACT

Systems for and methods of generating three-dimensional objects from a medium capable of selective physical transformation upon exposure to synergistic stimulation, whereby sheets of medium corresponding to cross-sectional layers of the three-dimensional object are dispensed from a source, the dispensed sheets then being selectively exposed to synergistic stimulation thereby forming a layer of the three-dimensional object, the areas not exposed to synergistic stimulation being removed, and whereby successive sheets corresponding to successive cross-sectional layers are dispensed and selectively exposed to synergistic stimulation and integrated together with preceding layers to provide substantially a layer by layer buildup of the three-dimensional object, thereby forming the three-dimensional object.

39 Claims, 3 Drawing Sheets

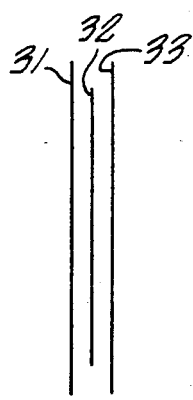
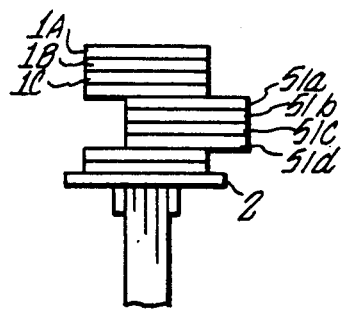
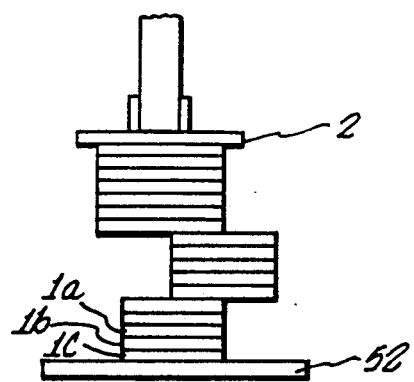
FIG. 1A.  FIG. 1B.  FIG. 1C.
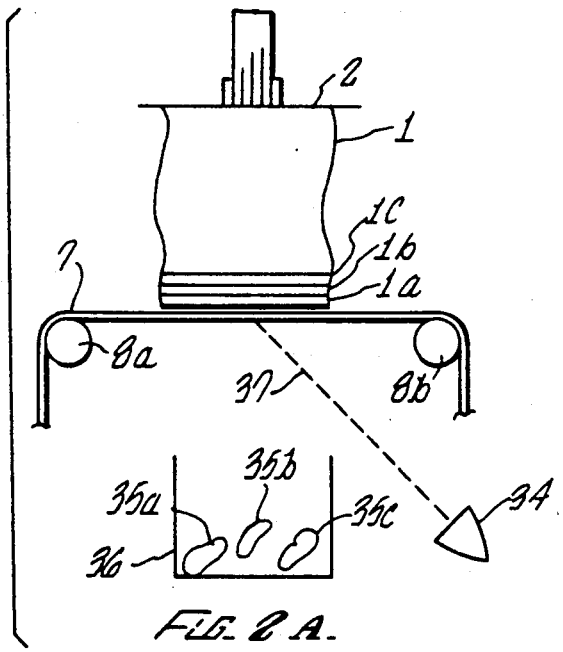
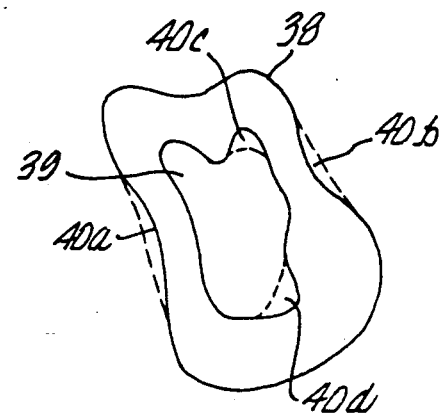
FIG. 2A.  FIG. 2B.
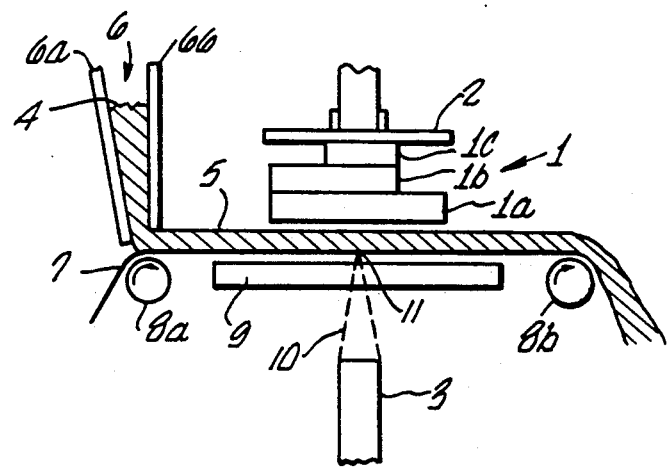
FIG. 3.

APPARATUS FOR BUILDING THREE-DIMENSIONAL OBJECTS WITH SHEETS

This is a continuation of co-pending application Ser. No. 589,060, filed on Sep. 27, 1990.

BACKGROUND OF THE INVENTION

1. Field of the Invention

This invention relates generally to systems and related methods for producing three-dimensional objects out of a medium capable of physical transformation upon exposure to synergistic stimulation and more specifically, for producing three-dimensional objects out of sheets or films of the material corresponding to cross-sections of the object.

2. Background of the Invention

Stereolithography is a process for building up an object layer by layer such that the layers are sequentially formed adjacent to one another until the overall production is complete. The stereolithographic production is commonly referred to as a stereolithographic object or part, or more simply, part. The process is described in more detail in U.S. Pat. No. 4,575,330, entitled "APPARATUS FOR PRODUCTION OF THREE-DIMENSIONAL OBJECTS BY STEREOLITHOGRAPHY," by Charles W. Hull, which issued Mar. 11, 1986, and which is hereby fully incorporated by reference herein as though set forth in full. As described in U.S. Pat. No. 4,575,330, a stereolithographic apparatus ("SLA") is an apparatus for producing an object through the process of stereolithography. One embodiment of an SLA comprises synergistic stimulating means such as a UV laser or the like for producing a UV-beam of synergistic stimulation, a material such as a photocurable liquid resin placed in a vat, which is capable of physical transformation upon exposure to synergistic stimulation, and an elevator means. This SLA forms each layer of a part by tracing the cross-sectional pattern on the surface of the material with the UV laser beam at an exposure sufficient to cure the liquid resin to a predetermined thickness beyond the surface.

The elevator means supports the part as it is being built up, with the first layer of the part adhering to and being supported by cured resin in the shape of webs or the like, known as a base or support, which base or support, in turn, directly adheres to the elevator means. Subsequently formed layers are then stacked on top of the previously formed layers. As the part is being built up, the elevator means progressively lowers itself into the vat of liquid resin. At each step of the way, after a layer has been formed, the elevator means lowers that layer (along with all the other formed layers) into the vat of liquid resin so that fresh liquid resin, that will be used to form the next layer, flows over the previous layer. Typically, the elevator means is lowered into the liquid resin by more than the desired thickness of the next layer so that the liquid resin will flow over the previous layer rapidly. This results in excess resin (resin of greater thickness than the next desired layer thickness) coating over at least a substantial portion of the previous cross-section. The elevator means is then raised and one or more techniques of decreasing the excess resin thickness are implemented so that a coating thickness of depth substantially equal to the next desired layer thickness is achieved. At some point during the process, the upper surface of the previously cured cross-section is positioned to be a depth below the desired liquid surface (known as the working surface) substantially equal to the next desired layer thickness. This process prepares the surface of the resin and position of the previous layer for exposing the next cross-section and adhering it to the previous layer. The various methods of decreasing the thickness of the excess resin are disclosed in several of the following co-pending patent applications. Alternatively, the material level may be raised as opposed to the part being lowered or a combination involving both techniques may be used.

For further details on stereolithography, reference is made to U.S. Pat. 4,575,330 and the following pending U.S. and international patent applications, which are incorporated herein by reference in their entirety, including appendices attached thereto or material incorporated therein by reference, as if fully set forth:

| U.S. Pat. application Ser. No. | Filing Date | Inventor(s) | Status |
|---|---|---|---|
| 07/183,021 | 4/18/88 | Freed | Abandoned |
| 07/182,823 | 4/18/88 | Hull et al. | Abandoned |
| 07/182,830 | 4/18/88 | Hull et al. | U.S. Pat. No. 5,059,359 |
| 07/183,016 | 4/18/88 | Modrek | U.S. Pat. No. 4,996,010 |
| 07/183,014 | 4/18/88 | Hull | Abandoned |
| 07/182,801 | 4/18/88 | Hull et al. | U.S. Pat. No. 4,999,143 |
| 07/183,015 | 4/18/88 | Smalley | U.S. Pat. No. 5,015,424 |
| 07/268,428 | 11/8/88 | Freed | Abandoned |
| 07/268,408 | 11/8/88 | Hull | Abandoned |
| 07/268,429 | 11/8/88 | Modrek et al. | U.S. Pat. No. 5,076,974 |
| 07/268,816 | 11/8/88 | Spence | U.S. Pat. No. 5,058,988 |
| 07/268,837 | 11/8/88 | Spence et al. | Pending |
| 07/268,907 | 11/8/88 | Spence et al. | U.S. Pat. No. 5,059,021 |
| 07/331,644 | 3/31/89 | Hull et al. | Pending |
| 07/339,246 | 4/17/89 | Hull et al. | Pending |
| 07/365,444 | 6/12/89 | Leyden et al. | Pending |
| 07/414,200 | 9/28/89 | Hull et al. | Pending |
| 07/415,168 | 9/29/89 | Hull et al. | Pending |
| 07/429,911 | 10/27/89 | Spence et al. | Pending |
| 07/427,885 | 10/27/89 | Spence et al. | Pending |
| 07/429,435 | 10/30/89 | Smalley et al. | Pending |
| 07/429,301 | 10/30/89 | Lewis et al. | Abandoned |
| 07/495,791 | 3/19/90 | Jacobs et al. | Pending |
| 07/515,479 | 4/27/90 | Almquist et al. | Pending |
| 07/545,517 | 6/28/90 | Cohen | U.S. Pat. No. 5,096,530 |
| 07/566,527 | 8/13/90 | Jacobs et al. | Abandoned |

In the above described embodiment using a liquid photopolymer, because of the viscosity of the liquid resin, the time required to coat a previous layer of the object with a fresh layer of liquid resin in preparation for formation of the next layer can be prohibitively long. This is explained in more detail in U.S. patent application Ser. No. 07/515,479, referenced earlier. Therefore, a need exists for more rapidly delivering a fresh layer of material resin to a previous object layer.

In addition, as explained in more detail in U.S. patent application Ser. Nos. 339,246; 183,015; and 182,801, liquid resin generally shrinks when it solidifies upon exposure to UV radiation or other synergistic stimulation, and this shrinkage may result in distortion of the resultant object. To minimize this shrinkage and resultant distortion, the above embodiment preferably employs a beam of synergistic stimulation which is directed to trace, and therefore sequentially solidify, only a small portion of each layer at a time. By sequentially solidifying each portion of a layer, fresh liquid resin will be allowed to flow into the voids caused by shrinkage, and thereby reduce distortion. A problem with sequentially solidifying each layer, however, is that layer solidification will take more time than if selective flood exposure to the synergistic stimulation were employed. Therefore, a need exists for employing flood exposure of the synergistic stimulation to solidify a layer without introducing excessive distortion into the object.

Also, with current resins, layer thicknesses less than about 5 mils are difficult, if not impossible to achieve, which limits the vertical resolution of the part. Therefore, a need exists for building parts with smaller layer thicknesses.

Finally, preferred commercial methods of part building are directed to the use of flowable building materials such as photopolymers. Other flowable materials include powdered materials that are solidified by sintering or by selective dispensing of chemical agents such as binders or the like. A need exists to expand the range of materials which can be used to build three-dimensional objects, such as metals or other materials.

Accordingly, an object of the subject invention is to decrease the time required to coat a previous layer of the object with a fresh layer of material in preparation for formation of the next layer of structure. Another object is to decrease the time required to expose the fresh layer to synergistic stimulation without increasing distortion caused by shrinkage of the material upon exposure to the synergistic stimulation. Additional objects are to decrease the layer thickness achievable, and to expand the range of materials which can be used in three-dimensional part building.

Additional objects and advantages of the invention will be set forth in the description which follows or will be apparent to those of skill in the art who practice the invention.

SUMMARY OF THE INVENTION

To achieve the foregoing objects, and in accordance with the purpose of the invention as embodied and broadly described herein, there is provided an apparatus for and related method of producing a three-dimensional object from sheets of a material capable of selective physical transformation upon exposure to synergistic stimulation, comprising: a source of the sheets; means for dispensing at least one of the sheets from the source onto a substantially flat working surface of a previous cross-section; means for forming a next cross-section of the object by selectively exposing a first portion of the sheet to the synergistic stimulation according to a corresponding representation of the next cross-section, whereupon the first portion selectively physically transforms, and a second portion of the sheet, which may be identical to the first portion, forms the next cross-section, any remaining material in the sheet comprising a third portion of the sheet; and means for substantially removing at least some material from areas in the third portion of the sheet.

BRIEF DESCRIPTION OF THE DRAWINGS

FIGS. 1(A), 1(B), and 1(C) illustrate an embodiment using semi-solid films of reactive material such as films of a photoresist;

FIGS. 2(A) and 2(B) illustrate an embodiment of the subject invention in which the synergistic stimulation cuts and ablates material from a layer of the material which has already been adhered to a previous cross-section leaving material in the shape of the next cross-section;

FIG. 3 illustrates an embodiment of the subject invention which employs a web to dispense a layer of the material to a working surface;

DESCRIPTION OF THE PREFERRED EMBODIMENTS

Figure 4:
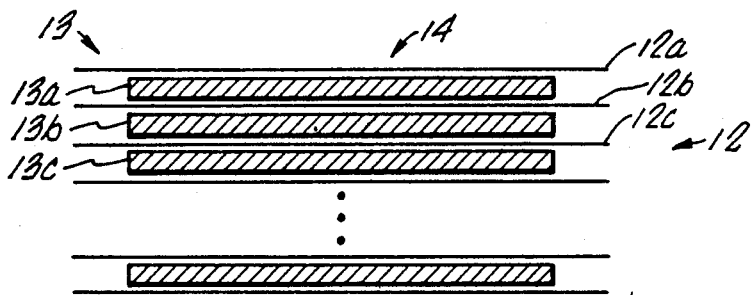
FIG. 4 illustrates an embodiment of the subject invention wherein pre-formed films of the material are dispensed from a cartridge.

Each of the embodiments of the invention disclosed in this section differ according to one or more of the following elements: A) a choice and form of a material; B) dispensing means for dispensing a sheet of the material; C) the type of reaction used for forming the next cross-section out of the layer; D) the means used to adhere the next cross-section to the previous cross-section; and E) removal means for removing material in the layer which is not part of the next cross-section. An outline of various choices possible for each of these elements is provided below:

A. Choice and form of materials.
 1. metal sheets
   a) aluminum;
   b) steel;
   c) carbon/aluminum matrix or sandwich; and
   d) other metal sheets.
 2. non-reactive plastic sheets
   a) thermo-plastic
 3. reactive sheets
 4. reactive "plastic" sheets ("plastic" is defined as the combination of reactive monomers or polymers and possibly a filler)
   a) positive or negative resists;
   b) dry films;
   c) bichromated gelatins;
   d) diazo materials;
   e) photopolymers;
   f) thermally-initiated polymers ("thermal plastics"); and
   g) modified semi-solid film polymer sheets (e.g., two layers of reactive material)
 5. thixotropic materials
 6. other glueable sheets of materials
   a) paper
   b) plastic
B. dispensing means
 1. pre-formed rolls
 2. pre-formed films in a cartridge 3. means for forming sheets as needed and delivered to the working surface by means of a web
4. platen
5. thermal transfer printing C. reaction used to physically transform the material
1. electro-magnetic reaction
2. particle reaction
3. chemical reaction
4. thermal reaction
5. disassociative reaction
6. ablative reaction D. adhering means
1. self-adhesive
2. pressure-adhesive
3. photo-adhesive
4. wax-adhesive
5. moisture-sensitive adhesive E. removal means
1. forming object upside down
   a) dissection; and
   b) fall away
2. forming object right-side up
   a) dissection (either layer by layer or after part complete);
   b) lift away; or
   c) vacuuming.
3. peeling
4. developing (either layer by layer or after the part is complete)
5. differential adhesion
6. replacement with inert material.

In the following section, whenever an embodiment is discussed, the choice of elements which distinguish it from the other possible embodiments will be specifically mentioned.

A first embodiment of the subject invention, wherein the material capable of physical transformation is a semi-solid film of a photoresist, will now be presented. This embodiment comprises elements A.4 (material choice is reactive plastic sheets), B.1 or B.2 (dispensing means is preformed rolls or preformed films in a cartridge), D.3 (adhering means is photoadhesive), and E.3 or E.4 (the removal means is peeling or developing).

With respect to FIG. 1(A), a suitable semi-solid sheet generally includes a relatively strong supporting element 33, a reactive element 32, and a protective coating element 31. As such, typically the semisolid sheet is made up of 3 separate films: a polyethylene film 31, a dry or semi-solid reactive film 32, and a polyester film 33. The semi-solid reactive film typically has a thickness of 0.50–3 mils or more, the polyethylene sheet is typically about 0.9 mils thick, and the polyester (MYLAR) sheet is also typically 0.9 mils thick. The function of the polyester film is to apply support to the semi-solid film, which typically cannot support itself. In addition, the film can be formed into a roll of several hundred feet or longer with a width of 9–20 inches across. In this form, the film is dispensed by unwinding the roll. Alternatively, the film can be dispensed from a cartridge containing a plurality of individual pre-formed films each of the structure of FIG. 1, which are then successively dispensed from the cartridge to the working surface.

Many types of dry film are suitable, such as the AQUA MER DRY FILM PHOTORESIST from Hercules, Inc., of Wilmington, Del., or the like. Aqua Mer is an aqueous processable, dry-film photoresist. The composition of Aqua Mer is 26–30% acrylic/methacrylic ester monomers, 0.3–0.4% photoinitiator, an inert filler, and a base-soluble binder. This dry film is reactive to UV light. Its peak reactivity is at a wavelength of 365 nm. It has been found that a HeCd laser having a wavelength of 325 nm, although not optimal, is still a suitable source of synergistic stimulation for this dry film photoresist.

Other types of photoresists are possible, as long as the photoresist has a photochemical reaction effect, such as a change in a physical characteristic such as solubility, adhesion, etc., upon exposure to synergistic stimulation. Typically, the synergistic stimulation will cause a differential solubility between exposed and unexposed portions.

In addition, photoresists are possible which differ according to the composition of the substance which is used to selectively remove (develop) the portions of a layer which are not to be included in the structural portion of the cross-section formed from the layer. In general, three types of film are typical, which differ according to the type of developer used for material removal: 1) solvent; 2) semi-aqueous; and 3) aqueous. With the first type, an organic solvent such as dichloromethane, trichloromethane, or the like, may be used for removal. With the second type, a semi-aqueous solvent may be used for removal, comprising water and an organic, water-soluble solvent (which typically contains oxygen functionality for water solubility) such as ethers, esters, polar materials, cellosolve, carbitol, or the like. With the third type, an aqueous solvent is used for removal. Aqueous or semi-aqueous solvent systems typically contain a mild base such as sodium or potassium carbonate, or potassium hydroxide, in low concentrations (0.1–5%) and are used at temperatures of 20°–50° C. or higher. Typically, the hotter the temperature, the faster the solvent works, but the less selective it is also. The specific solvent and temperature used depends on the differential solubility of the exposed and unexposed regions. A mild base is typically used if the dry film has acid functionality as part of its composition.

Finally, both positive and negative photoresists exist. As is known, in a negative photoresist, exposed portions of the film are kept as the next cross-section, while unexposed portions are dissolved, and therefore removed by the developer. In a positive photoresist, the unexposed portions are kept, and the exposed portions are removed by the developer.

Other considerations regarding the choice of film is that commercially available films may not be of a uniform thickness, but, instead, may vary by ±10% or greater, for example, which may violate an assumption during object formation that the films are of a uniform thickness. In this instance, means must be provided for detecting and correcting or compensating for any variation in thickness. Alternatively, more uniform dry-films are required.

A further consideration is that the unexposed film, once dissolved, can not be reused, and in addition, the dissolved film and solution may require being disposed of as a toxic waste. If toxic waste is a problem, then a dry film should be used which does not require a developing step. In this type of dry film, after exposure through the film backing (e.g. a MYLAR cover sheet), the film backing is removed, which also, through selective adhesion characteristics, removes unexposed semi-solid photopolymer. The exposed areas adhere to the previous layer more strongly than to the film backing. Alternatively, if a positive photoresist is being used, the exposed areas would be removed with the film backing.

A final consideration in the choice of a material is the thickness. The thinner the films, the better the vertical accuracy of the object. In fact, a major benefit of this embodiment is the use of thinner layers of structure than is otherwise generally considered practical.

Many variants of the removal means are possible. In one variant, the film on a layer which is not part of the corresponding cross-section is left in place until the entire part is built. Then, the entire part is developed to remove this film. A problem with this variant may be "print through". Alternatively, the unused film is removed by developing the current cross-section before the next cross-section is formed. In this variant, a problem may be associated with providing support for the film from which the next cross-section will be formed while it is proximate to the working surface adjacent to the previous cross-section.

As stated previously, the dry film can be exposed either through the film backing, or alternatively, it can be exposed after the film backing has been removed. In either case, however, the film backing must eventually be removed. In one variant, the film backing can be removed in a peeling step as described in more detail in U.S. patent application Ser. No. 07/414,200, referenced earlier. Alternatively, a solvent soluble film backing (its solubility in the solvent being different from that of the semi-solid film) can be used with a dissolving step. For a water soluble film backing comprised of POLYVINYL or the like, instead of MYLAR, can be used which can be dissolved upon exposure to water. Or, a TEFLON backing can be used which is UV-transparent, and which will stick less to the semi-solid film. The TEFLON backing is also removed in a peeling step, but removal is easier compared to the removal of a MYLAR film. Another variant is to use a dry film with a release agent between the MYLAR film and the semi-solid film.

To build a three-dimensional object, a dry film is selected, the protective coating element (e.g. polyethylene film) is pulled off, and then the unprotected (and tacky) surface of the dry film is placed in intimate contact with the surface of the previously (most recently) formed object cross-section. This surface was the working surface when this previous cross-section was formed. The tacky nature of the unprotected and untransformed surface will cause it to adhere to the previous cross-section. Next, a force is supplied typically by a roller or the like to the backing film in order to insure intimate contact between the present layer of semi-solid film and the previously formed cross-section and to remove any trapped gas (e.g. air). This process also allows for a more controllable thickness. The roller can advantageously be heated to allow the dry film, which is, in actuality a liquid photopolymer, to flow better, and adhere better to the previous cross-section as well as to allow any non-uniformity in film thickness to be removed. Then, the dry film is exposed to synergistic stimulation from a suitable synergistic stimulation source. The exposure can be applied as a flood exposure through a mask, in which case the film may be advantageously exposed through the film backing (as long as the synergistic stimulation can pass through the backing). If flood exposure is used, the mask should be thin and placed in intimate contact with the previous cross-section and the synergistic stimulation should only strike the material substantially perpendicularly to avoid undercutting. Alternatively, the MYLAR film could be removed, and the source of synergistic stimulation selectively directed by means of a computer according to a data representation of the next cross section, to selectively trace out the cross-section, in which case, a mask would not be needed. Alternatively, the desired pattern of synergistic stimulation can be imaged onto the working surface. The film backing provides strength to the semi-solid film, and in addition, may provide for increased photospeed by lessening reaction inhibition due to the presence of oxygen. Adhesion to the previous cross-section simultaneously takes place while material in the current film is being formed into the next cross-section. As is known, when using a negative dry film, adhesion will occur as long as the exposure of the synergistic stimulation is sufficient to achieve a cure depth which extends beyond the film thickness, and into the previous cross-section. After the film backing is removed, the synergistically exposed film is optionally placed in a suitable developer if material removal is to be performed on a layer by layer basis, or alternatively, the developing step can take place after the entire object is formed. Means such as a spray nozzle or the like can be used to forcibly apply the developer to the portion of the film to be removed, which may more rapidly dissolve away this portion of the film. In either case, the above process then repeats itself for formation of the next cross-section. In the case of a positive photoresist, the adhesion between layers is obtained by the application of pressure as described above. An intermediate layer of adhesive can be used, if necessary, to insure adhesion.

A variant of the above embodiment is to employ a dual-cure approach, in which a first source of synergistic stimulation is used to cut out an outline of the current cross-section from the semi-solid film, and a second source is used to solidify and adhere this cross-section to the previous cross-section.

The object may be built right-side up, as illustrated in FIG. 1(B), or upside down, as illustrated in FIG. 1(C). In both figures, the most recently formed layers are identified as 1a, 1b, and 1c. A consideration with the approach shown in FIG. 1(B) is providing support to cantilevered areas such as 50. A number of options are available to provide support should that be necessary. First, web supports, could be provided as described in U.S. application Ser. No. 07/182,801. Second, the material on the previous layers, 51a, 51b, 51c, and 51d, which is not part of the respective cross-sections, could be left in place and removed once the object is built. Third, this material could be removed on a layer-by-layer basis, and replaced with an inert material such as wax.

A consideration with the approach shown in FIG. 1(C) is the weight of the part which may cause it to delaminate or separate from the platform 2. In this instance, support could be provided through inert (and transparent) member 52. With this approach, exposure of the next layer 1a could take place through the member. However, a release agent or some other means (such as MYLAR, TEFLON, or polyethylene film in conjunction with a peeling step) to release the member from the layer 1a after exposure must be provided, as described in U.S. patent application Ser. No. 07/414,200. Additionally the same methods employed to give support to the object when built using the approach of FIG. 1(B) can also be used. Use of an inert medium to provide support can have the same form as it did in the previous approach. Alternatively, a transparent liquid medium could be used that can surround and support the object that is being built even when plate 52 is pulled away and the release agent is peeled away. An additional layer of material is brought into contact with the previously formed cross-section while the inert liquid medium is displaced from the between the layer and the cross-section.

When using an inert medium, it may be advantageous to form each layer somewhat thicker than that desired in the final part. Thereby, after removal of the unwanted building material, the voids can be filled in by excess inert material, resulting in inert material filling in all the required voids and also coating, at least in part, over the (extra thick) structural layer of the part. This extra thickness of the structural layer as well as of the inert material coating the structural layer can be removed in a shaving or slicing step which results in an appropriate structural layer (proper thickness) having a clean upper surface which is ready for adhesion to the next structural layer, as well as inert filling material having an upper surface is at the same level as the upper surface of the structural layer. Further, this upper surface can act as an excellent support means for any unsupported (by the previous structural layer) portions of the next structural layer.

A second embodiment of the subject invention comprises using an infrared laser such as a $CO_2$ laser or the like to cut out a pattern from a thin film according to representations of corresponding object cross-sections, and thereafter or simultaneously "registering" the patterns to the object under formation, and then insuring adhesion (e.g. gluing) of the patterns to the object. This embodiment corresponds to elements A.1 or 0.2 or 0.6 (material of choice being aluminum sheets, steel sheets, plastic sheets, paper sheets, or the like); B.1 or 0.2 (dispensing means of choice being pre-formed rolls or preformed films in a cartridge); C.4 or 0.5 (the reaction of choice being a thermal reaction or a disassociative reaction); D.1, 0.2, or 0.5 (the adhering means of choice being a material which is self-adhesive, or the use of pressure-sensitive, or moisture-sensitive adhesives); and E.1 or 0.2 (the removal means comprising means for forming the object upside down, and dissection means whereupon excess material falls away, or alternatively means for forming the object right-side up, dissection means, and means for lifting excess material away) from the previous outline. For this embodiment, a suitable laser is a powerful infrared laser such as a $CO_2$ laser having a wavelength on the order of 10.6 microns. Other suitable lasers include solid state lasers, or diode-pumped Nd:YAG lasers, provided that the material substantially absorbs the wavelength of the laser and the depth of cutting can be reasonably controlled.

An advantage of this embodiment is that it will be very fast, since the laser is only being primarily used to cut out an outline of a cross-section, and not to transform the entire cross-section, including interior portions.

A second advantage of this embodiment is that it is not limited to the use of materials that solidify in response to synergistic stimulation (e.g. photopolymers), but instead, can be used with a much broader range of materials, including metals, and plastics and other non-reactive materials. A particularly advantageous choice of material is a carbon/aluminum matrix or sandwich, in which carbon is added so that the material will more strongly absorb the laser light. If carbon were not added, the aluminum might reflect the laser light and not ablate.

A third advantage would be reduced distortion since no shrinkage occurs, except right at the perimeters of each cross-section.

This embodiment is illustrated in FIG. 2(A). As illustrated, a sheet 7 of material is placed over rollers 8a and 8b, which in this example, move clockwise. As the rollers rotate, the sheet moves transversely from left to right. The sheet can be a continuous sheet, or alternatively, can be dispensed from a roll which unwinds as the rollers rotate clockwise. Also shown is platform 2 which is capable of being moved up or down by means of an elevator (not shown), and partially-formed part 1 comprised of most-recently formed layers 1a, 1b, and 1c. The embodiment also comprises synergistic stimulation source 34, which directs a beam 37 of synergistic (ablative) stimulation to impinge upon material 7. Finally, the embodiment comprises a container 36, for collecting scraps 35a, 35b, and 35c of material which have been cut away from the sheet by the source of synergistic stimulation in the course of part building.

In this example, the source of synergistic stimulation is a $CO_2$ laser, and the material is a non-reactive material such as a thermoplastic, metal or the like which ablates to a specifiable depth upon being sufficiently exposed to the synergistic stimulation. In addition, the synergistic stimulation source is situated so that the beam impinges upon the sheet from an angle, thereby allowing scrap material to fall into the container without falling upon or otherwise disrupting the source of synergistic stimulation. Additionally, it is advantageous to ablate the material in such away that as the material begins to fall away from the layer that is forming the next cross-section, the material does not block the path of synergistic stimulation. This may be insured by beginning the scanning at the side of the cross-section closest to roller 8a and working towards the side of the cross-section closest to roller 8b. Alternatively, other ordering techniques can be used.

The process of building a part will now be explained with this embodiment, it being assumed that a portion 1 of the part has already been built, including layers 1a, 1b, and 1c. First, the elevator is directed to move the platform (and already-built part layers) upwards in order to allow full movement of the sheet of material 7 underneath layer 1a. Second, the sheet is caused to move transversely from left to right until a fresh portion of the sheet is below layer 1a and covers enough area to form the next cross-section. In this example, the topmost surface of the sheet 7 is coated with a pressure sensitive adhesive, such as an anaerobic glue or the like. Third, the elevator is directed to lower the platform (and layer 1a) until layer 1a contacts and adheres to the uppermost surface of the material directly beneath the layer. Fourth, the synergistic stimulation source is directed to trace an outline of the next cross-section of the part on the underside of the sheet 7 according to a representation of that cross-section derived from a CAD/CAM system or the like. Alternatively, a rigid plate (not shown) could be moved under sheet 7 and between rollers 8a and 8b to serve as a rigid support during the gluing process so that the stiffness of the sheet does not need to be relied on when pressing the partially formed part to it to cause adhesion.

FIG. 2(B) provides an illustration of the manner in which a cross-section is formed out of the sheet of material 7. The synergistic stimulation is directed to trace the outline 38 of the cross-section. In the usual case, the material in the sheet which is not part of the next cross-section will then fall away, since it will not be adhered to the previous cross-section. However, in some cases, material will adhere to the previous cross-section which is not part of the cross-section being formed. Areas 40a to 40d represent two such areas. In this case, another approach should be used, in which the synergistic stimulation is directed to ablate the overlapping material in these areas.

In this approach, first, the synergistic stimulation is directed to cut away material which will not be part of either the present or previous cross-section. In FIG. 2(B), this can be accomplished by directing the laser to trace out the contour surrounding the outer contour 38 of the present cross-section plus areas 40a and 40b of the previous cross-section, and the contour which surrounds the area surrounded by inner contour 39 of the present cross-section, but which excludes areas 40c and 40d of the previous cross-section. Second, the laser beam is directed to ablate material which has adhered to the previous cross-section, but which is not part of the next cross-section. In FIG. 2(B), this is areas 40a–40d.

In cutting out the next cross-section, it will be important to maintain careful control over the cutting depth of the synergistic stimulation in order to prevent the previous cross-section from being damaged. This can be accomplished with a synergistic stimulation source such as a $CO_2$ laser, in which an intended cutting depth can be achieved within a 1 mil or better tolerance. Therefore, in the case in which the cross-sections are 5 mils in thickness, setting the cutting depth at 6 mils will ensure that the material forming a cross-section will be completely cut away from the sheet, with only, at most, a 1 mil mark left on the previous cross-section.

Additional precautions associated with this embodiment involve the cutting away of sections of the layer without causing distortion to those sections that are to remain. For example, if the present cross-section contains a narrow cantilevered section, this section could be damaged if the boundary along its perimeter is the last portion of a section that is to be cut away. Therefore, the scanning order should be such that fragile portions of a cross-section will not be damaged when cutting away undesired sections or a layer. Therefore, when removing material from fragile sections, it may be desirable to cut out small regions of material around the section so that the weight of a large piece of clinging material will not damage the region that is to remain and also so that the weight of the clinging material does not change the position of the section enough to cause the synergistic stimulation to strike and cut the material in inappropriate places.

Several alternatives to this embodiment are possible. In one alternative, the beam of synergistic stimulation is directed to impinge upon the sheet of material from above. In this alternative embodiment, means such as a vacuum plate, or an electromagnetic plate, or the like should be added in order to lift scrap material from the cross-section being formed, and then disposing of it. The electromagnetic plate or vacuum plate may or may not be capable of selectively attracting scrap material from selective areas on the layer. In the case of nonselective attraction, precautions must be taken so that delamination of adhered cross-sections does not occur. Or, this alternative could be limited to the production of parts with no interior contours needing to be cut out. It may be necessary to replace the removed material with an inert material in order to provide support for the next cross-sections. Support may similarly be required for the scrap material after it has been cut away, but before it has been removed by appropriate removal means. Alternatively, a coating material can be used over the present layer of structure that does not substantially absorb the synergistic stimulation, that will not be ablated by it, and that adheres to the layer of material. This coating can be used to lift away scrap material from the cross-section (e.g. a plate of quartz).

A second alternative involves using a material which both ablates upon exposure to synergistic stimulation from source 34, and which polymerizes upon exposure to a synergistic stimulation from a second source which is added. The process of part formation proceeds as above, except that the sheet of material need not be coated on its uppermost surface by a pressure sensitive adhesive. Instead, the surface can be covered by a polyethylene, MYLAR, or TEFLON film as discussed earlier with respect to the dry film photoresist embodiment, which would be peeled off when fresh material is caused to move into position below layer 1a. The exposed material may be tacky, and therefore adhere to the previous cross-section 1a without the need of an adhesive. After initial contact, the second source of synergistic stimulation would be used to expose, cure, and therefore further adhere, the material on the current cross-section to the previous cross-section.

A third alternative includes dissecting the scraps of material with the laser beam into smaller scraps before they fall away, or are lifted away. Doing so will facilitate material removal, since dissected material may be easier to vacuum out, blow away, or fall away after inversion. As an additional alternative, this embodiment allows material to be removed on periodic layers as opposed to being removed on each layer.

Alternatives are also possible with different types of adhesives other than pressure sensitive glue. For example, the uses of UV sensitive glues or time sensitive glues are also possible.

A fourth alternative involves the use of sheets of building material which are relatively transparent to radiation necessary to cure a photosensitive adhesive (for example, clear plastic sheets). The sheet from which the present cross-section will be formed is initially coated with a photosensitive adhesive and placed in contact with the previous cross-section. This initial coating with adhesive is placed on the side of the sheet that will contact the previous cross-section. Next, it is pressed to the previous cross-section by a member to ensure that the sheet and adhesive combination will be at the proper thickness for forming the next cross-section of the object (net layer thickness=thickness of sheet+thickness of the cured adhesive). Next, the sheet is selectively exposed to curing radiation in a pattern appropriate for the next cross-section. This radiation will adhere the present and previous cross-sections. Next, the cross-section is cut from the sheet, and the portions of the sheet which do not contribute to the next cross-section are removed. These portions will be those portions which have not been adhered to the previous cross-section.

Sheets made of conductive materials are also possible with this embodiment. Conductive materials may be useful for the production of, for example, blow mold forms, or aluminum aircraft parts. Another possible material for the film is a material which depolymerizes in response to exposure to the synergistic stimulation, instead of ablating. In this case, the exposed material could be subjected to a developer to remove the exposed material, and separate the material which is to be retained as part of the current cross-section from material which is not to be retained. An example of such a material is BAKELITE, or similar material employing a NOVOLAC chemistry technology.

A third embodiment of the subject invention is illustrated in FIG. 3. This embodiment corresponds to items A.4 (the preferred material is a reactive plastic sheet); B.3 (the sheets are formed as needed and delivered to the working surface); C.1 (the means for forming individual cross-sections from the sheets is a form of electromagnetic radiation); D.3 (the means for adhering the cross-sections together is a photo-adhesive); and E.5 (the preferred removal means is by differential adhesion) of the previous outline. As illustrated, the embodiment comprises platform 2, member 9, synergistic stimulation source 3, rollers 8a and 8b, non-reactive film 7, and material dispenser 6. The platform is affixed to an elevator (not shown) for moving the platform up and down, and the member is comprised of a substance which is transparent to the synergistic stimulation. In the case where the synergistic stimulation is UV light, a member comprised of quartz, PYREX, sapphire, or the like, is suitable.

The synergistic stimulation source 3 is a source of Uv radiation or the like which is capable of physically transforming material 4. Material dispenser 6 comprises blades 6a and 6b, or the like, which are tapered as shown to hold of source of material 4. Material 4 is a material which is capable of physical transformation upon exposure to the synergistic stimulation.

Rollers 8a and 8b may rotate clockwise to move non-reactive film 7 from left to right as shown. Non-reactive film 7 is a film of MYLAR, NYLON, polyethylene, or the like, which does not substantially react to the synergistic stimulation. The film should be kept thin enough so it will not absorb the synergistic stimulation. For UV radiation, a film of 2 mils or less will be suitable. Blade 6b is slightly offset upwards from blade 6a to be a distance approximately equal to the desired layer thickness, as shown, so that a layer 5 of material 6 having this thickness naturally forms, and is then caused to extend from left to right by movement of the MYLAR film from left to right. As rollers 8a and 8b rotate, causing film 7 and material 4 to move to the right, appropriate pressure may be applied to the top of material 4 in dispenser 6 to insure that the appropriate amount of material is dispensed onto film 7.

Synergistic stimulation source 3 emits a beam 10 which impinges upon the bottom surface of film 5 at point 11. The point of impingement 11 of the beam on the bottom surface can be caused to trace an appropriate pattern so that a desired cross-section of material 4 can be selectively and controllably exposed to form a desired cross-section of the object 1. Alternatively, flood exposure employing a mask, a light valve, or the like can be used.

Also shown is previously transformed layers 1a, 1b, and 1c, of object 1, which are formed on top of each other, and which adhere to platform 2.

Material 6 is typically a liquid photopolymer such as CIBATOOL XB-5081 or the like, which solidifies upon exposure to UV radiation. Typically, the material has a viscosity of 1,000 centipoise or more. XB-5081, for example, has a viscosity of about 3,000 centipoise at 25° C. High viscosity photopolymers are advantageous since they typically shrink less relative to less viscous photopolymers, and therefore, for the reasons discussed earlier, can be used to form object layers upon exposure to flood UV radiation or the like, instead of being formed upon sequential tracing of a beam of synergistic stimulation over a layer of the material. In addition, since a fresh layer of the material is formed and delivered by movement of the MYLAR film past the dispenser, it is no longer necessary that the viscosity of the material be kept low enough to facilitate recoating by means of overdipping, which is described in more detail in U.S. patent application Ser. No. 07/515,479 referenced earlier.

A variety of viscous materials are suitable, including a frozen photopolymer or a partially polymerized monomer. Alternatively, a dry film photopolymer such as RISTON, manufactured by DuPont, or the like, can be used. A dry film photopolymer is particularly advantageous since it has a volume shrinkage of less than about 1%.

The steps of forming a next layer of a three-dimensional object with this embodiment will now be described, it being assumed that layers 1a, 1b, and 1c have already been built as indicated, and that platform 2 with layers 1c, 1b, and 1a attached as shown has been moved upwards from member 9 as shown by the elevator to provide room for the next layer. It has also been assumed that rollers 8a and 8b have been rotated to cause MYLAR film 7 to move from left to right, which movement continues until a layer 5 of the material has extended as shown along the full extent of the face of member 9. The movement of the film in conjunction with the slight offset of blade 6b from blade 6a, as shown, will cause a generally uniform layer to form over the member. Next, platform 2 and previous cross-sections 1a-1c are moved downward so that the lower surface of 1a is placed in contact with material 4 over sheet 7. The thickness of material 4 between sheet 7 and the lower surface of 1a is substantially that of the desired layer thickness.

First, the beam 10 of synergistic stimulation passes through member 9 and film 7, and is modulated or controlled to selectively expose layer 5 according to a representation of a corresponding cross-section of the object, whereupon material in the layer forms the next cross-section of the object. Typically, the film can be moved at a velocity of about 100 cm/sec, and then stopped. The previously formed cross-section 1a is placed in intimate contact with the previous cross-section by the elevator so that it will adhere to the next cross-section as the next cross-section forms. Alternatively, layer 5 can be exposed in a strip by strip manner as it is moving such as with a thermal or LED printhead.

A benefit of this embodiment is the elimination of the "print-through" problem described in U.S. patent application Ser. No. 07/365,444, referenced earlier, whereby the intensity needs to be limited to avoid unwanted curing of material. Here, print-through is not a problem since the depth of exposure is limited already by the thickness of layer 5. Therefore, layer 5 can be overexposed by a factor of 3 or 4 or more for extra hardness. Another advantage is that the material can be sufficiently cured through exposure to the beam of synergistic stimulation making a post-curing step, as described in U.S. Pat. No. 5,076,974 and U.S. patent application Ser. No. 07/566,527, referenced earlier, unnecessary.

The exposed material may stick to the film. Therefore, as described in U.S. patent application No. 07/414,200, referenced earlier, means may need be added to peel the film off of the exposed material before the elevator is raised again.

For example, one approach to solving the sticking problem is to coat the film with a release agent, such as a silicone material, before depositing the material on it. A possible drawback is that the release agent may get between adjacent layers of the part, leading to possible delamination.

Another approach is to place wax paper between the material and the film, and then heat the wax paper in order to release it.

A third approach is to employ a film made of polyethylene, TEFLON, or other non-polar substance, and then add a peeling step, as described in U.S. patent application Ser. No. 07/414,200, to peel the film off the exposed material. A further approach is to employ a film comprised of a material such as polystyrene, which dissolves in a solvent. In this approach, the film could be removed simply by exposing the exposed material and film to the solvent. A POLYVINYL film, for example, is water soluble.

Second, the elevator is raised again to lift the exposed material making up the just-formed cross-section out of the unformed material, which remains on the film.

Third, the MYLAR film is caused, by means of the rollers 8a and 8b, to move left to right to cause a fresh material layer to move into place under the just formed cross-section, and also to cause the unformed material from the just formed cross-section to move out of the way whereupon it can possibly be reclaimed to rejoin material 4 in dispenser 6 for use in forming future cross-sections. The process then repeats itself.

An aspect of this embodiment is building the object upside down, which may cause the object to lose adhesion with the platform because of the weight of the part, especially for heavy parts. Smaller parts, however, should be able to be built without losing adhesion with the platform.

An alternative method of practicing this embodiment is to form parts right-side up. The coating can be made as shown, and then, through the use of additional rollers or the like, the film can be turned upside down and then it can be brought into contact with the upper surface of a partially completed part which is being built right-side up.

A fourth embodiment of the subject invention will now be described with the aid of FIG. 4. This embodiment corresponds to item B.2 (the dispensing means is preformed films from a cartridge) of the previous outline. In this embodiment, dispenser 6 is replaced with cartridge dispenser 14 which houses a plurality of pre-formed films 12a, 12b, and 12c, of material which are separated by support films 13a, 13b, and 13c, respectively. Support films 13a, 13b and 13c are comprised of a substance such as MYLAR, NYLON, or a solvent-soluble (including water-soluble) substance. A water-soluble substance is advantageous in terms of ease of removing the support film, since removal can simply be accomplished by dipping in water after exposure. The operation of this embodiment remains as described earlier, except that in the first step, the material dispenser is a film cartridge dispenser.

Figure 5:
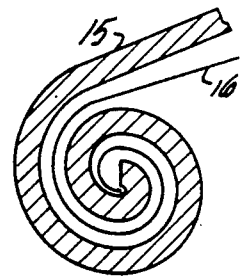
FIG. 5 illustrates an embodiment of the subject invention wherein a layer of the material is dispensed from a continuous roll of the material.

A fifth embodiment can be illustrated with the aid of FIG. 5. This embodiment corresponds to item B.1 (the dispensing means includes a pre-formed roll of sheets) of the previous outline. Compared to the embodiment of FIG. 3, in this embodiment, dispenser 6 is replaced with a pre-formed continuous roll 15 of material which is rolled up with NYLON film 16 or the like so portions of the pre-formed material will not stick. In this embodiment, the roll is caused to unwind in order to extend a layer of the material over member 9 in preparation for forming the next cross-section.

Figure 6A:
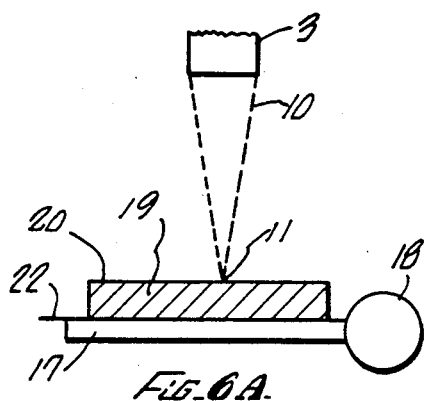
FIGS. 6(A) and 6(B) illustrate an embodiment of the subject invention which employs a rotatable platen to deliver a next cross-section of the object to a previous cross-section.
Figure 6B:
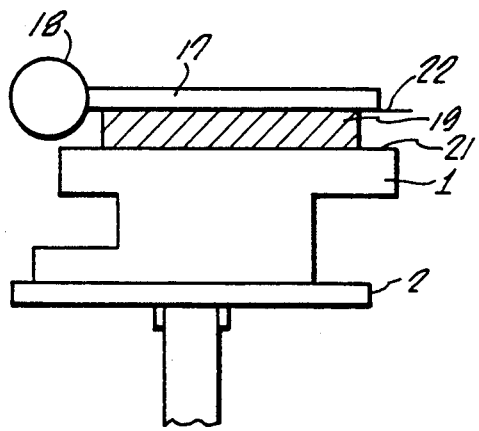

A sixth embodiment is illustrated in FIGS. 6a and 6b. This embodiment corresponds to item B.4 (the dispensing means includes a platen) of the previous outline. This embodiment employs platen 17 which is rotatable around point 18. An advantage of this embodiment is that very high viscosity material can be used which will shrink less, and therefore lead to less distortion. Also, thixotropic materials could be used, which would be easy to apply in variable thicknesses.

With respect to FIG. 6(A), a layer 19 of unformed material is first deposited on the upper surface of the platen as shown. Material may be deposited having an excess thickness, and the excess material could then be rapidly machined off, or removed through the application of heat, vibrations, or the like, in order to obtain the desired coating thickness. Next, the source 3 directs a beam 10 of synergistic stimulation to selectively expose the layer according to a representation of a corresponding next cross-section of the object, whereupon material in the layer transforms into the next cross-section.

After the layer has been formed, the platen is then rotated clockwise as shown in FIG. 6b and it is "registered" with object 1 so that the upper surface 20 of the layer comes into contact with the upper surface 21 of the previously formed cross-section of object 1. Previously, the surface 21 may have been sprayed with a pressure sensitive adhesive or the like, so that upon contact, the two surfaces adhere to one another. Alternatively, the surface may be tacky enough to adhere, and therefore eliminate the requirement of spraying with a pressure-sensitive adhesive.

Next, the platen must be separated from the material of layer 19. To accomplish this, a MYLAR, NYLON or solvent-dissolvable film 22 could be placed on the platen before the material is deposited in order to separate the platen from the material, as shown in FIG. 6(A).

Then, with respect to FIG. 6(B), after the layer 19 has been adhered to the object 1, the platen could be rotated counter-clockwise, and the film 22 will allow the platen to be separated from the next cross-section without damaging it. Then, the film 22 could be peeled off or dissolved off of the cross-section using one of the means described in U.S. patent application Ser. No. 07/414,200, referenced earlier. An alternative to using a MYLAR or nylon film to separate the platen from the cross-section, and thereafter peeling off the film, is to pass a hot wire between the platen and the next cross-section to separate them.

In this embodiment, the untransformed material of layer 19 may be separated from the transformed material prior to rotation of the platen to adhere surfaces 20 and 21 together. Alternatively, the untransformed material could be removed after adhesion. This unexposed material in layer 19 can be removed while layer 19 is still on the platen by dissolving it away with solvent or the like. Alternatively, the unexposed material can remain with layer 19, and after adhesion to the previously formed portion of the part, it can be removed or it may be removed along with the other unexposed material associated with the other layers after the entire part is formed.

An alternative to the above embodiment where planar slices (cross-sections) are formed, it is possible to calculate and use cylindrical slices. Also, printing roller techniques can be used as a means of transferring a film from one substrate to another.

An advantage of this embodiment, even compared to the other embodiments, is that there will be even less distortion caused by curl or the like since the layer 19 is not in contact with the object 1 when it is being exposed. As explained in U.S. patent application Ser. No. 07/339,246, referenced earlier, the distortion caused by curl occurs when material is being exposed and therefore transformed while it is in contact with previously transformed material. Exposing layer 19 while it is isolated on the platen will avoid this.

An alternative embodiment to the above, instead of moving the next cross-section on the platen to the object being formed, is to keep the cross-section stationary, and move the object to that cross-section. This could be accomplished by forming the object on a rotatable platen which rotates to "register" with and to bring into contact with the next cross-section.

Another alternative would be to deposit dry film on the platen.

Figure 7A:
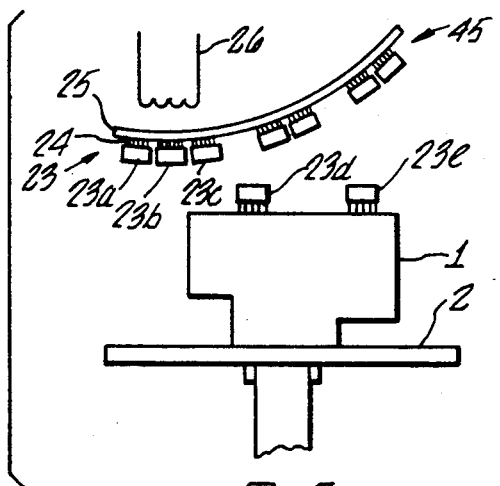
FIGS. 7(A), 7(B), and 7(C) illustrate an embodiment of the subject invention employing thermal transfer printing to dispense a layer of the material to a working surface on a previous cross-section.

A seventh embodiment comprises thermal transfer of particles of solidified material onto an object under formation. This embodiment corresponds to items B.5 (the dispensing means is by thermal printing) and D.4 (the adhering means is by use of a wax adhesive) of the previous outline. This embodiment is illustrated in FIG. 7(A). In this embodiment, a multi-layer sheet 45 is placed over a previously-formed portion 1 of an object. The sheet comprises solidified particles 23, which are adhered to MYLAR or NYLON film 25 by means of low melting point release agent 24, which may be wax or the like.

Next, heating element 26 is selectively applied along film 25. The heating element 26 should be capable of applying heat to selected areas of film 25, in order to accomplish selective transfer of particles 23. An element with a high thermal gradient will accomplish this. The heat from the element causes low-melting point release agent 24 to selectively release particles 23, and deposit and adhere them to already-formed part 1. The adherence takes place as the release agent, which is deposited along with the particles, resolidifies. Selective application of the heating element 26 leads to selective depositing of the particles. In the Figure, for example, particles 23a, 23b, and 23c are not transferred, while particles 23d and 23e are. Then, the process repeats itself for the next cross-section. The release agent can be any thermally or UV reactive, low-melting point material, such as a thermoplastic, or the like.

In this embodiment, it is advantageous to ensure that particles 23 be of a uniform thickness, which thickness is also large compared to the thickness of the layer release agent 24, since this will ensure the formation of a cross-section of essentially uniform thickness. A release agent which does not spread significantly when heated also helps to ensure uniform thickness.

An advantage of this embodiment is that particles 23, being already solidified, do not need to be post-cured, and also do not have the attendant shrinkage and curl problems. Additional advantages are that the material making up the particles does not need to be a photopolymer, and that the source of synergistic stimulation can be any source, from a laser to a conventional heating element, that is capable of selective heating.

Another advantage is that the parts built according to this embodiment will be advantageous for use in investment casting, whereby a part is covered with a casting material, which hardens around the part to form a mold. A problem in the formation of such a mold is that the part must somehow be collapsed and removed from the interior of the mold. With this embodiment, the part can be collapsed simply by reheating the release agent which is holding all the particles together, causing the agent to melt, and the part to collapse.

Figure 7B:
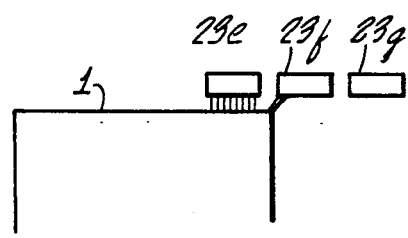

A problem that may sometimes arise with this embodiment is building portions of layers which are unsupported from below. In FIG. 7(A), for example, particles 23d and 23e are shown as supported from below by the already-formed portion of the part. To the extent that a portion of a layer must be built unsupported from below, one alternative is to apply less heat to these particles so that all the release agent does not/flow to the bottom of these particles, but instead, some remains on the sides to adhere these particles to adjacent particles, as illustrated in FIG. 7(B), which shows particles 23f and 23g, unsupported from below, but adhered to adjacent particles.

Figure 7C:
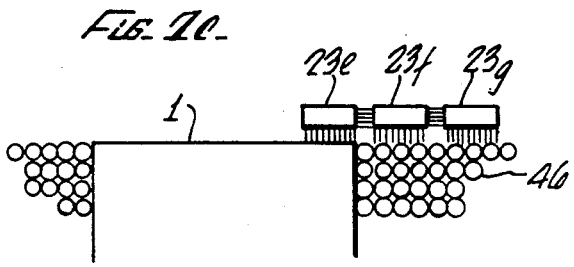

Another solution to this problem is to dispense powder in the interstices of a layer, which will support particles from upper layers. In FIG. 7(C), for example, particles 23f and 23g are shown as being supported by powder 46. Then, after the part has been built, the powder could be washed away. Any powder that remains bound by the release agent could remain, and if the diameter of the powder particles is kept small enough, vertical accuracy would not suffer significantly.

Alternatively, a liquid could be used for support, although in this case, the unsupported particles should be transferred in sequence along a direction which radiates outward from the solid portion of the previous layer. In FIG. 7(C), for example, particle 23f would be deposited before particle 23g. This will ensure that the particles will adhere to adjacent particles before they can float away, which avoids a problem analogous to birdnesting.

Another alternative is to use two sources of synergistic stimulation in a manner analogous to the embodiment of FIG. 1. One source would be directed to cut out an outline of the current cross-section, which would then rest on the previous cross-section, without requiring support for the outlying areas. The second source of synergistic stimulation would then be directed to selectively expose those portions of the current cross-section resting over the previous cross-section, causing the release agent in these areas to melt, and then resolidify, adhering the two cross-sections together at these areas.

Figure 8:
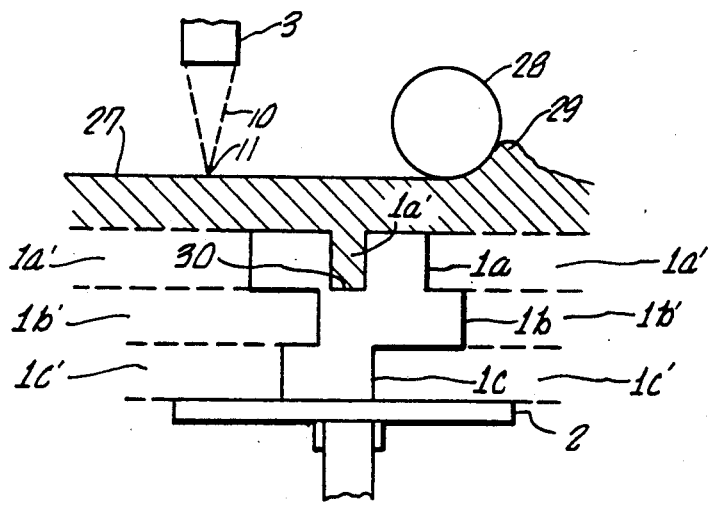
FIG. 8 illustrates an embodiment of the subject invention in which material in a layer which has not been transformed into a next cross-section is removed and replaced with an inert substance.

An eighth embodiment is illustrated in FIG. 8. In this embodiment, an object 1 is built up, as before, through successive layers 1a, 1b, and 1c. This embodiment corresponds to items B.3 (the dispensing means includes a means for forming sheets as needed and delivering them to the working surface) and E.6 (the removal means includes a means for replacing the removed material with an inert material) of the previous outline.

In this embodiment, however, the source 3 of synergistic stimulation is placed above the next layer 27 of the material to be formed, and directs a beam 10 to emanate downwards to selectively expose point 11 of the material layer. In this embodiment, the material is frozen or partially solidified photopolymer or the like, and the next layer 27 is formed by placing a layer or sheet of this material on top of the object, as shown, and then rotatably moving a roller pin 28 over the layer or sheet in order to provide a smooth layer with a generally uniform thickness and also to remove any excess material 29. The pin is rotated counter-clockwise as the pin moves from left to right, and vice versa, clockwise, when the pin is moved from right to left.

A key aspect of this embodiment is rendering areas occupied by material in the layer which has not been exposed inactive, so that the "print through" problem, referenced earlier, will not be present. With reference to FIG. 8, reference numerals 1a', 1b', and 1c' represent the areas corresponding to unexposed portions of previous layers which should be rendered inactive. Another advantage to doing so, relative to simply removing the unexposed material on each layer, is to create a solid foundation for supporting the next layer 27 of material to be formed. If the unexposed material 1a', 1b', and 1c' were simply removed, the material in layer 27 over this unexposed material would remain unsupported, and simply collapse downwards.

One approach to rendering these portions inactive is to simply remove the unexposed material immediately after the rest of the material on this layer has been exposed, and to replace it with a low melting solid such as powders, beads, wax, or the like, which thereafter cools and hardens to provide support for additional layers, and which is later removed. Other materials may be suitable provided they are inert with respect to the synergistic stimulation used, that is, provided that the synergistic stimulation used does not affect the later removal of the material.

Print through can additionally be reduced by spray-coating thin layers of a strong absorbing material between the main structural layers forming the object.

In this embodiment, unexposed material 30 in a trapped volume can also be removed and replaced by an inert material to provide support for the next layer. Or, the unexposed material could be left in place, and removed after the entire object is built, although this might result in a "print-through" problem, or to a shrinkage problem of the exposed portions of the layers relative to the unexposed portions, which may compound itself over time.

Another approach to the above is to use a material with two different photoinitiators, each sensitive to different synergistic stimulation. The layer 27 could be selectively exposed by a first source of synergistic stimulation tuned to the first photoinitiator in a pattern according to a representation of a corresponding cross-section of the object. This material thereafter physically transforms and adheres to the previous layer. The rest of the material on the layer could then be flood exposed by a second source of synergistic stimulation tuned to the second photoinitiator in a pattern according to a mask which represents the portion of the layer which is not to be part of the cross-section, whereupon this material also physically transforms into an inert form which can also be washed or dissolved away upon application of a suitable solvent without damaging the cross-section.

Another method of rendering the material inactive is simply to spray it with a suitable chemical.

Figure 9A:
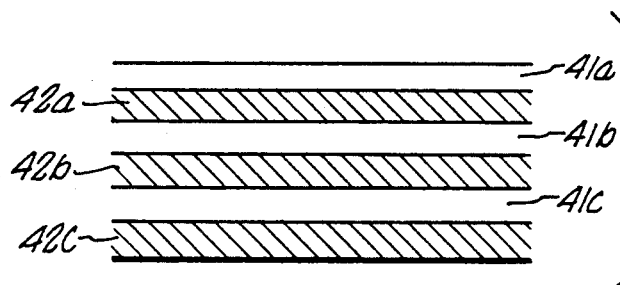
FIGS. 9(A), 9(B), and 9(C) illustrate an embodiment of the subject invention in which each cross-section is formed from a sandwich of two different materials.

A ninth embodiment is directed to employing a multilayer sheet or film for each cross-section, where each layer may be of a different material. This embodiment corresponds to items A.4.g (the material of choice is a modified reactive polymer sheet with two layers of reactive material) of the previous outline. FIG. 9(A) illustrates this approach, in which films a, b, and c are comprised of layers 41a and 42a, 41b and 42b, and 41c and 42c, respectively. Layers 41a, 41b, and 41c are all comprised of a second material, while layers 42a, 42b, and 42c are all comprised of a first, but different, material. Alternatively, the materials can be the same photopolymer, but with a different amount or type of photoinitiator added to the material in each layer. Moreover, the films are advantageously prepackaged, as illustrated in FIG. 9(C), in which the film "a" is packaged between a MYLAR film backing 44, and a polyethylene film 43, and then dispensed from a cartridge dispenser or the like in the course of building up the part. As discussed previously, means must be provided for peeling off the MYLAR or polyethylene backings in the course of building up the part.

An advantage of this embodiment is that through an appropriate selection of materials, and the use of more than one source of synergistic stimulation, the print-through problem can be effectively eliminated or controlled.

For example, with respect to FIG. 9, the first material can be chosen such that it solidifies upon exposure to radiation from a first source of synergistic stimulation, but which absorbs strongly (and therefore blocks) radiation from a second source of synergistic stimulation. The second material should be chosen such that it solidifies and also photobleaches upon exposure to radiation from the second source of synergistic stimulation, but which absorbs strongly (and therefore blocks) radiation from the first source of synergistic stimulation before it has been photobleached by exposure to the second source. The second material should also not block (or photobleach) upon exposure to radiation from the first source before it has been photobleached by exposure to the second source.

Figure 9B:
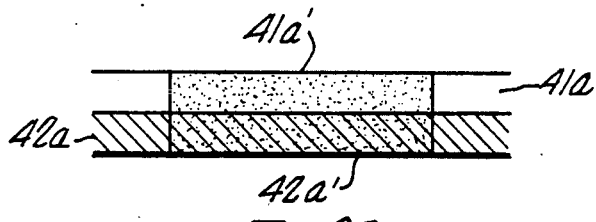
Figure 9C:
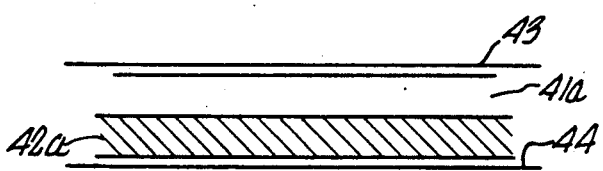

The process of part formation can be illustrated by means of FIG. 9(B), in which identifying numerals reference like elements compared with FIGS. 9(A) and 9(C). First, the material in layer 41a (the second material) is selectively exposed to the second source of radiation according to a representation of the corresponding cross-section, whereupon material in the layer (identified with reference numeral 41a') selectively solidifies (and photobleaches). Print through from the second source is not present since radiation from this source is blocked by layer 42a, and is not allowed to pass through to lower layers. Next, the material in layer 42a (the first material) is selectively exposed to radiation from the first source. This radiation will be blocked by layer 41a except in the area 41a' which has been photobleached. In this area, the radiation will pass through to selectively solidify areas within layer 42a, identified by reference numeral 42a' in the figure. The exposed areas on each layer will generally be identical.

Print through from the first source will be substantially reduced because this radiation will be substantially blocked by the areas of the previous "a" layer not exposed to the source, and therefore not photobleached.

An alternative to the above embodiment is to dispense a material on alternate layers which is sensitized to different synergistic stimulation and strongly absorptive or reflective of the synergistic stimulation of the alternating layers. This embodiment is similar to that described above except the need for the photobleaching reaction is removed. Print-through is substantially avoided by the strong absorption of the alternating layers.

Figure 10A:
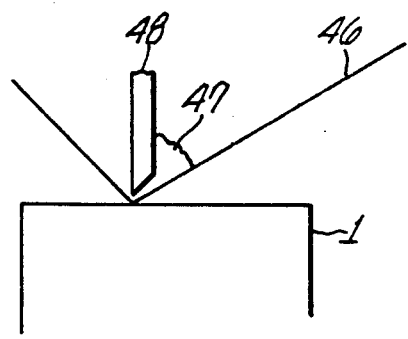
FIGS. 10(A) and 10(B) illustrate an embodiment of the subject invention in which a layer of thixotropic material is delivered to a working surface on a previous cross-section by means of a wire mesh.

A tenth embodiment is oriented around the use of thixotropic materials. This embodiment corresponds to item A.5 (the preferred material is thixotropic) of the previous outline. This embodiment is illustrated in FIG. 10(A), and comprises a previously-completed portion 1 of a part, a wire mesh or mask 46 representing the next cross-section, a squeegee 48, and a thixotropic material 47. The wire mesh has selective holes in it in a pattern representative of the next cross-section, which holes allow the selective passage of the thixotropic material.

Figure 10B:
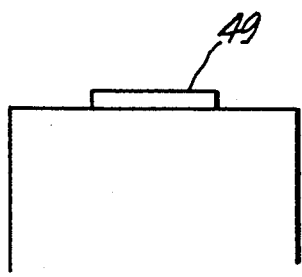

The process operates as follows: first, the wire mesh is placed above the previously-formed layer, and the squeegee is pushed down on the mesh until the mesh is in contact with the previous layer. Then, material 47 is placed in front of the squeegee, and the squeegee moved from left to right, in the process, depositing a layer of the thixotropic material on the previous layer. This is shown in FIG. 10(B), in which the deposited layer is identified with reference numeral 49. The thickness of the deposited layer will depend on the wire mesh thickness and hole size, and the speed of the squeegee.

An important aspect of this embodiment is the use of the thixotropic material. A thixotropic material has a viscosity depending on the sheer stress applied to it. With no stress applied, the material will be very viscous, but when sheer stress is applied by the squeegee, for example, the material will flow easily. Therefore, the stress applied by the squeegee will cause the material to flow easily through the mesh and onto the previous layer, but when the stress is removed, the material will not flow or spread, and will maintain a relatively uniform thickness. If the material is UV-curable, the material could then be cured by subjecting it to UV-radiation, causing it to adhere to the previous layer.

Alternatively, a layer of thixotropic material of uniform thickness could be applied simply by cutting away excess material with a razor blade or the like. In fact, with this approach, a more uniform thickness may even be possible than obtainable with dry film photoresists.

In another variation, the material could be initially applied in the manner shown in FIG. 10(A), and then a razor blade used to shave away any excess.

An advantage of thixotropic materials is that they will exhibit less shrinkage. Fillers could be added to remove shrinkage even more.

Other methods of applying the thixotropic materials are possible, such as by means of a roller pin, blade recoater, squeegee, or hot wire.

Additional advantages and modifications will readily occur to those skilled in the art. The invention in its broader aspects is not, therefore, limited to the specific details, representative methods, and illustrative examples shown and described. Accordingly, departures may be made from such details without departing from the spirit or scope of applicant's general incentive concept.

What is claimed is:

1. An apparatus for producing a three-dimensional object from sheets of material solidifiable upon exposure to synergistic stimulation, wherein portions of said sheets solidify to form cross-sections of said object, comprising:
   a source of said sheets;
   means for dispensing successive sheets from said source onto a working surface adjacent to previously formed cross-sections;
   a source of said synergistic stimulation;
   means for forming successive cross-sections of said object by selectively exposing first portions of said successive sheets to said synergistic stimulation according to corresponding representations of said successive cross-sections, whereupon said first portions solidify, and unexposed regions comprise second portions of said sheets;
   means for substantially removing at least some material from said second portions of said sheets; and
   means for adhering said successive cross-sections to said previously formed cross-sections to form said three-dimensional object.

2. The apparatus of claim 1 wherein said source includes means for forming said sheets on a support film.

3. The apparatus of claim 1 wherein said source of synergistic stimulation is selected from the group consisting of a thermal print head and an LED print head.

4. An apparatus for producing a three-dimensional object from sheets of material solidifiable upon exposure to synergistic stimulation, wherein said sheets solidify to form cross-sections of said object, comprising:
   a source of said sheets;
   means for dispensing successive sheets from said source onto a working surface;
   a source of said synergistic stimulation;
   means for forming successive cross-sections of said object by selectively exposing first portions of said successive sheets to said synergistic stimulation according to corresponding representations of said successive cross-sections, whereupon said first portions solidify, and unexposed regions comprise second portions of said sheets;
   means for substantially removing at least some material from said second portions of said sheets;
   means for transporting said successive cross-sections from said working surface to a position adjacent to at least one previously formed cross-section;
   means for adhering said successive cross-sections to said at least one previously formed cross-section, said three-dimensional object being formed from a plurality of adhered cross-sections.

5. The apparatus of claim 1 wherein
   said first portions are substantially insoluble in a developer and said second portions are soluble in said developer, and
   wherein said removing means comprises means to dissolve said at least some material in said second portions in said developer.

6. The apparatus of claim 1 further comprising:
   a source of a second synergistic stimulation;
   means for selectively exposing at least a perimeter of said cross-sections to said second synergistic stimulation thereby cutting said first portions from said second portions;
   wherein said synergistic stimulation serves to adhere said first portions of successive cross-sections to said previously formed cross-sections.

7. The apparatus of claim 1 further comprising means for substantially filling in parts of said second portions of said successive sheets with a material which is substantially inert to said synergistic stimulation.

8. The apparatus of claim 1 wherein said forming means forms said object by dispensing successive sheets below said previously formed cross-sections, and said removing means comprises means for dissecting material in said second portions, and allowing dissected material to fall away from said working surface due to gravity.

9. The apparatus of claim 1 wherein said forming means forms said object by dispensing successive sheets above said previously formed cross-sections, and said removing means comprises means for dissecting material in said second portions, and lifting away dissected material from said working surface.

10. An apparatus for producing a three-dimensional object from sheets of insoluble material which becomes soluble upon exposure to synergistic stimulation, wherein portions of said sheets form cross-sections of said object, comprising:
  a source of said sheets;
  means for dispensing successive sheets from said source onto a working surface adjacent to previously formed cross-sections;
  a source of said synergistic stimulation;
  means for forming successive cross-sections of said object by selectively exposing first portions of said sheets to said synergistic stimulation according to corresponding representations of said cross-sections that are to become soluble, whereupon said first portions become soluble, and unexposed regions comprise insoluble second portions of said sheets to form successive cross-sections of said object;
  means for adhering said successive cross-sections to said previously formed cross-sections to form said object; and
  means for substantially dissolving at least some material in said first portions of said sheets in said developer.

11. An apparatus for producing a three-dimensional object from sheets of material which is capable of selective cutting upon exposure to synergistic stimulation, wherein said sheets are cut to form cross-sections of said object, comprising:
  a source of said sheets;
  means for dispensing successive sheets having first and second portions, from said source onto a working surface adjacent to previously formed cross-sections prior to forming said successive cross-sections from said successive sheets;
  a source of said synergistic stimulation;
  means for forming successive cross-sections of said object by tracing at least perimeters of said first portions of said sheets with said synergistic stimulation according to corresponding representations of said perimeters of said successive cross-sections to cut and thereby separate said first portions from said second portions, wherein said first portions form successive cross-sections and are adhered together to form said object and wherein said second portions are removed;
  means for adhering at least parts of said first portions of said successive cross-sections to said previously formed cross-sections; and
  means for removing at least some material in said second portions of said sheets.

12. The apparatus of claim 2 wherein said means for forming said sheets on a support film includes means for locating a release agent between said film and said sheets.

13. The apparatus of claim 12 further comprising means to heat the release agent to cause release of said sheets.

14. The apparatus of claim 12 wherein the release agent is wax paper.

15. The apparatus of claim 4 wherein said transporting means comprises a platen on which said cross-sections are formed, and wherein said platen transports said cross-sections into contact with said at least one previously formed cross-section.

16. The apparatus of claim 15 further comprising means to coat a surface of said sheets with a pressure-sensitive adhesive.

17. The apparatus of claim 15 including means to separate said cross-sections from said platen comprising a release film located between said platen and said cross-sections.

18. The apparatus of claim 15 including means to separate said cross-sections from said platen comprising a means for passing a hot wire through said cross-section at a point adjacent to said platen.

19. The apparatus of claim 15 wherein said at least some material of said second portions is removed prior to said cross-sections being removed from said platen.

20. The apparatus of claim 5 wherein said second portions of at least one previously formed cross-section are removed after said at least one previously formed cross-section is formed but before said dispensing means dispenses a successive sheet onto said working surface.

21. The apparatus of claim 5 wherein said second portions of said cross-sections are removed after said three-dimensional object is formed.

22. The apparatus of claim 5 wherein said dissolving means includes means for selectively dispensing said developer onto regions of said sheets to be removed.

23. The apparatus of claim 22 wherein said developer is forcibly dispensed.

24. The apparatus of claim 6 wherein said removal means further comprises means to ablate second portions of at least one successive cross-section using said second synergistic stimulation, which second portions had been a first portion of an adjacent previously formed cross-section.

25. An apparatus for producing a three-dimensional object from sheets of insoluble material which becomes soluble upon exposure to synergistic stimulation, wherein portions of said sheets form cross-sections of said object, comprising:
  a source of said sheets;
  means for dispensing successive sheets from said source onto a working surface;
  a source of said synergistic stimulation;
  means for forming successive cross-sections of said object by selectively exposing first portions of said sheets to said synergistic stimulation according to corresponding representations of said cross-sections that are to become soluble, whereupon said first portions become soluble and unexposed regions comprise second portions of said sheets to form successive cross-sections of said object;
  means for substantially removing at least some material from said first portions of said sheets;
  means for transporting said successive cross-sections from said working surface to a position adjacent to at least one previously formed cross-section;
  means for adhering said successive cross-sections to said at least one previously formed cross-section, said three-dimensional object being formed from a plurality of adhered cross-sections.

26. The apparatus of claim 11 wherein at least a surface of said sheets is coated with an adhesive responsive to second synergistic stimulation, further comprising:
  a source of said second synergistic stimulation;

means for selectively exposing said adhesive to said second synergistic stimulation to cause adhesion between first portions of said successive cross-sections.

27. The apparatus of claim 26 wherein said adhesive is substantially non-responsive to said synergistic stimulation.

28. The apparatus of claim 27 wherein said adhesive is a photo-adhesive and said source of second synergistic stimulation emits electromagnetic radiation.

29. The apparatus of claim 28 wherein said sheets transmit said electromagnetic radiation and said electromagnetic radiation is selectively directed to expose said photo-adhesive through said sheets.

30. The apparatus of claim 11 wherein said at least some material in said second portions of a cross-section is removed prior to adhering said cross-section to said previously formed cross-sections.

31. An apparatus for producing a three-dimensional object from sheets of material which is capable of selective cutting upon exposure to synergistic stimulation, wherein said sheets are cut to form cross-sections of said object, comprising:
  a source of said sheets;
  means for dispensing successive sheets having first and second portions, from said source onto a working surface adjacent to previously formed cross-sections;
  a source of said synergistic stimulation;
  means for forming successive cross-sections of said object by tracing at least perimeters of said first portions of said sheets with said synergistic stimulation according to corresponding representations of said perimeters of said successive cross-sections to cut and thereby separate said first portions from said second portions, wherein said first portions form successive cross-sections to form said object and wherein said second portions are removed;
  means for adhering at least one of said successive sheets to said previously formed cross-sections prior to said at least one sheet being formed into a cross-section; and
  means for removing at least some material in said second portions of said sheets.

32. An apparatus for producing a three-dimensional object from sheets of material which is capable of selective cutting upon exposure to synergistic stimulation, wherein said sheets are cut to form cross-sections of said object, comprising:
  a source of said sheets;
  means for dispensing successive sheets having first and second portions, from said source onto a working surface adjacent to previously formed cross-sections;
  a source of said synergistic stimulation;
  means for forming successive cross-sections of said object by tracing at least perimeters of said first portions of said sheets with said synergistic stimulation according to corresponding representations of said perimeters of said successive cross-sections to cut and thereby separate said first portions from said second portions, wherein said first portions form successive cross-sections and wherein said second portions are removed;
  means for selectively adhering said successive cross-sections to said previously formed cross-sections to form said three-dimensional object; and
  means for removing at least some material in said second portions of said sheets wherein said removal means includes means to dissect said second portions into pieces wherever said second portions are adjacent to fragile portions of said cross-sections.

33. The apparatus of claim 32 wherein said dissecting means dissects into pieces, substantially all of said second portions.

34. The apparatus of claim 33 further comprising means for blowing away said pieces of said second portions.

35. The apparatus of claim 33 further comprising means for vacuuming away said pieces of said second portions.

36. An apparatus for producing a three-dimensional object from sheets of material which is capable of selective cutting upon exposure to synergistic stimulation, wherein said sheets are cut to form cross-sections of said object, comprising:
  a source of said sheets;
  means for dispensing successive sheets having first and second portions, from said source onto a working surface adjacent to previously formed cross-sections;
  a source of said synergistic stimulation;
  means for forming successive cross-sections of said object by tracing at least perimeters of said first portions of said sheets with said synergistic stimulation according to corresponding representations of said perimeters of said successive cross-sections to cut and thereby separate said first portions from said second portions, wherein said first portions form successive cross-sections and are adhered to previously formed cross-sections to form said object and wherein said second portions are removed;
  means for adhering said successive cross-sections to previously formed cross-sections;
  means for removing at least some material in said second portions of said sheets including means for ablating any parts of said second portions of a sheet which were first portions on a previously formed adjacent cross-section.

37. The apparatus of claim 36 further comprising means to control said forming means to cause tracing of a combined perimeter of first portions of a sheet and an adjacent previously formed cross-section, prior to tracing said perimeter of said first portions of said sheet which overlap said first portions of said adjacent previously formed cross-section.

38. An apparatus for producing a three-dimensional object from a plurality of sheets stacked along a vertical axis, from material which is capable of selective cutting upon exposure to synergistic stimulation from a first source, wherein said sheets are cut to form cross-sections of said object, comprising:
  a source of said sheets;
  means for dispensing successive sheets having first and second portions, from said source onto a working surface adjacent to previously formed cross-sections;
  a source of said synergistic stimulation;
  means for forming successive cross-sections of said object by tracing at least a perimeter of said first portions of said sheets with said synergistic stimulation from below said sheets according to corresponding representations of said perimeters of said successive cross-sections to cut and thereby separate said first portions from said second portions, wherein said first portions form successive cross-sections and are adhered to previously formed cross-sections to form said object and wherein said second portions are removed;

means for adhering said successive cross-sections to previously formed cross-sections; and means for removing at least some material in said second portions.

39. The apparatus of claim 38 wherein said forming means causes said synergistic stimulation to impinge on said sheets from below and from a non-vertical angle.

* * * * *